United States Patent
Weiher

[11] Patent Number: 5,950,497
[45] Date of Patent: Sep. 14, 1999

[54] HANDLEBAR FOR VEHICLES

[75] Inventor: Franz Weiher, Neustetten, Germany

[73] Assignee: Gustav Magenwirth GmbH & Co., Germany

[21] Appl. No.: 08/862,955

[22] Filed: May 30, 1997

[30] Foreign Application Priority Data

Oct. 2, 1996 [DE] Germany ........................ 296 17 132 U
Feb. 24, 1997 [DE] Germany ............................ 197 07 203

[51] Int. Cl.$^6$ .................................................. B62K 21/12
[52] U.S. Cl. .......................................................... 74/551.1
[58] Field of Search ................................ 74/551.1, 551.3, 74/551.4, 551.5, 551.6, 551.7; D12/178

[56] References Cited

U.S. PATENT DOCUMENTS

| | | | |
|---|---|---|---|
| 2,178,935 | 11/1939 | Henry | 74/551.1 |
| 4,503,729 | 3/1985 | Shimano | 74/551.1 |
| 5,117,708 | 6/1992 | Boyer et al. | 74/551.1 |
| 5,205,185 | 4/1993 | Herman | 74/551.1 |
| 5,257,552 | 11/1993 | Boyer et al. | 74/551.1 |

FOREIGN PATENT DOCUMENTS 2235816  2/1973  Germany ................................ 74/551.1

*Primary Examiner*—John A. Jeffery
*Assistant Examiner*—Mary Ann Battista
*Attorney, Agent, or Firm*—Leydig, Voit & Mayer, Ltd.

[57] ABSTRACT

A vehicle handlebar comprising a tubular, straight center section, preferably of round cross section, two tubular, straight outer sections, preferably of round cross section, the center axes of the two outer sections not coinciding with a center axis of the center section and the outer diameter of the two outer sections being smaller than that of the center section, and two, hollow bent sections joining the center section and the two outer sections, the outer diameter of the two hollow, bent sections tapering from the center section to the outer sections, which obviates the disadvantages described hereinabove and with use of the lowest possible amount of material is of adequate dimensions with respect to both bending stress and clamping strain, it is proposed that the wall thickness of the center section and the two outer sections be of identical size.

8 Claims, 3 Drawing Sheets

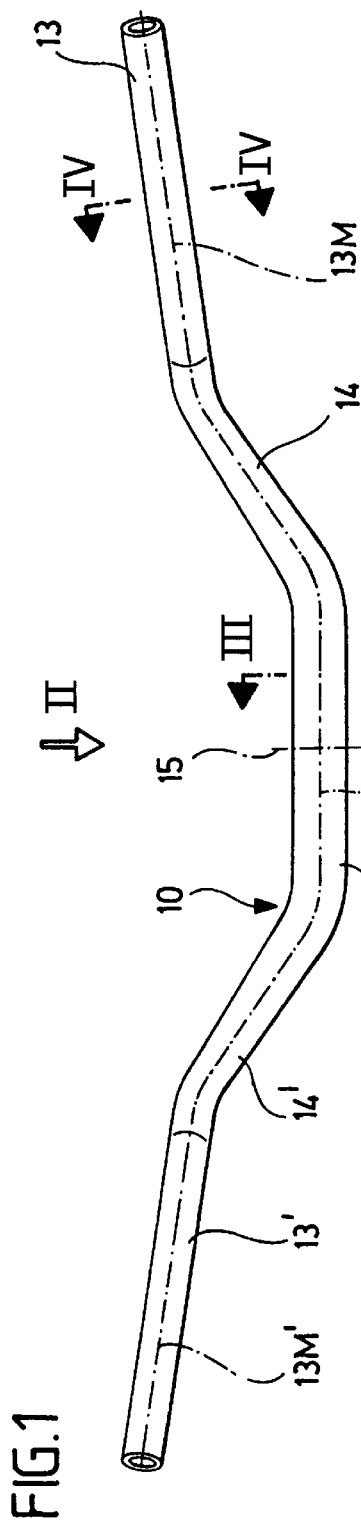
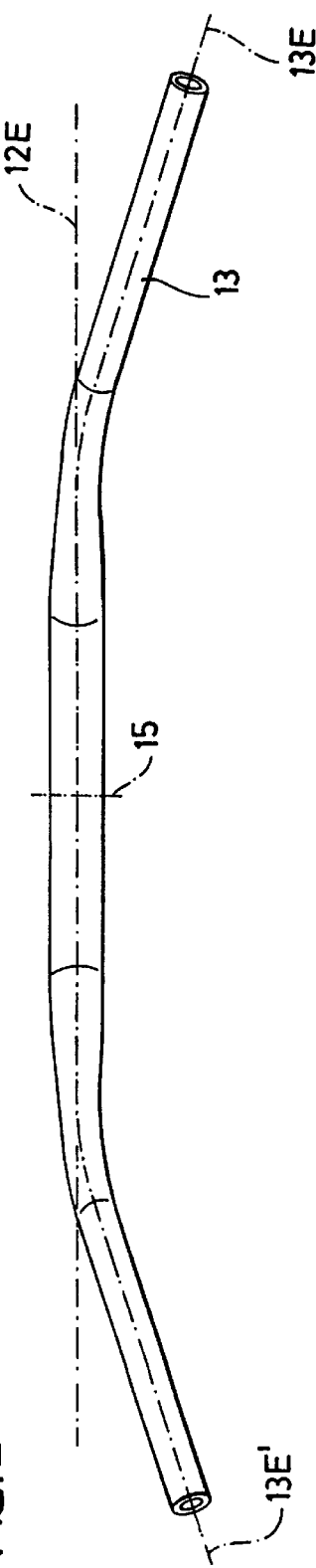
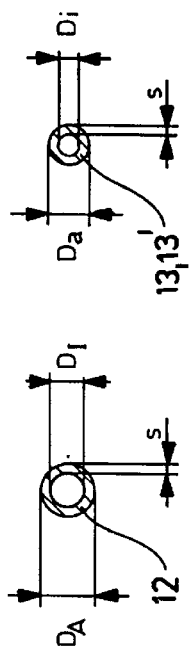
FIG.1
FIG.2
FIG.3
FIG.4

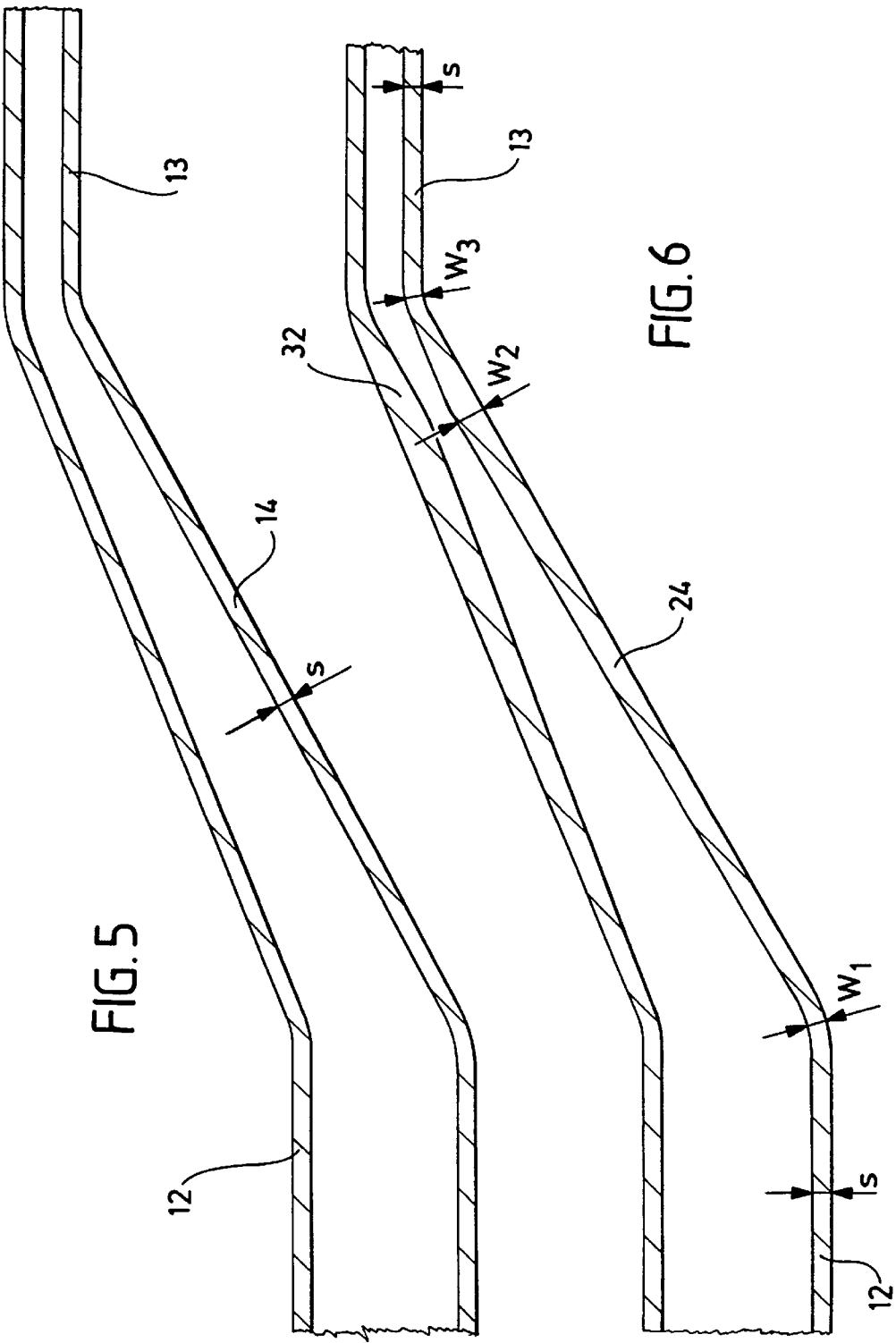

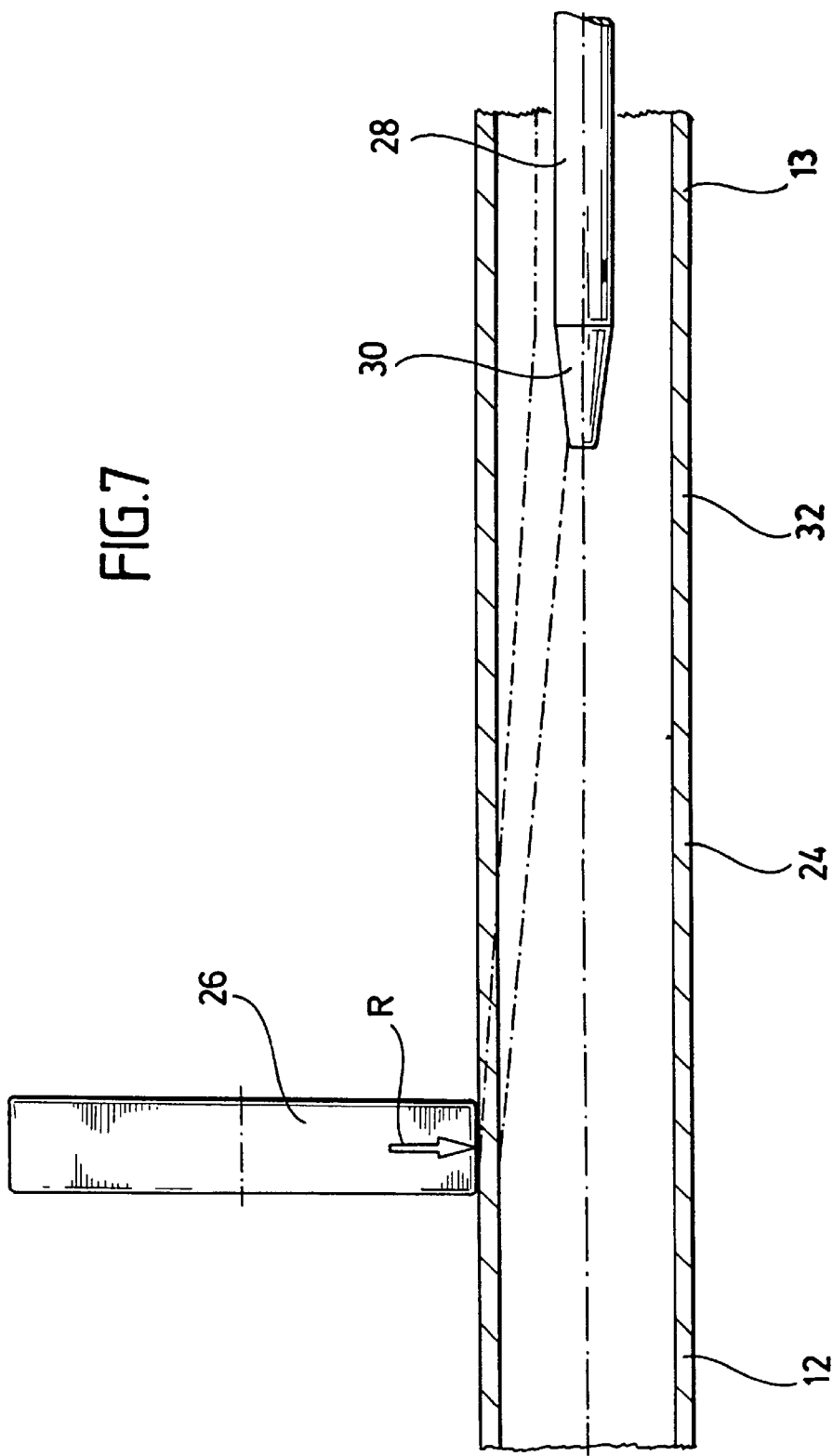

HANDLEBAR FOR VEHICLES

BACKGROUND OF THE INVENTION

The invention relates to a handlebar for vehicles, in particular, for motorcycles and bicycles, comprising a tubular, straight center section, preferably of round cross section, two tubular, straight outer sections, preferably of round cross section, the center axes of the two outer sections not coinciding with a center axis of the center section and the outer diameter of the two outer sections being smaller than that of the center section, and two hollow, bent sections joining the center section and the two outer sections, the outer diameter of the two hollow, bent sections tapering from the center section to the outer sections.

Such handlebars are known, for example, from U.S. Pat. No. 5,117,708. These handlebars are of tubular design, and the cross-sectional area of the tubes is the same size at every point so that the wall thickness is smallest in the center section and largest in the outer sections.

This wall thickness configuration involves a waste of material and an unnecessary increase in the weight of the handlebar, for the bending moment is smallest at the outer sections. Furthermore, the increasing of the wall thickness as compared with the highly stressed center section does not conform with the theoretical requirements, even if the outer diameter is reduced, as the dimensioning of the wall thickness has to be adapted to the requirements of the center section.

A further handlebar is known from U.S. Pat. No. 5,257,552. Herein the stress-related requirements are met insofar as the wall thickness is largest in the center section and smallest in the outer sections. However, the fact that the handlebar is not only stressed by the bending moments during the steering but also undergoes further stress by being clamped at the center section thereof to the vehicle and by the fittings, for example, brake lever, throttle lever, being clamped to the outer sections thereof is not taken into account.

Therefore, if the center section is dimensioned in a material-saving way such that the bending moment and the clamping force can be absorbed, and, if the wall thickness is smaller at the outer sections, this will then be adequately dimensioned for the bending moments which occur, but not for the clamping.

There is thus the danger that the tube will undergo deformation in the region of the outer sections and the fittings will, consequently, become detached.

This danger is further heightened by the fact that such handlebars are generally made of aluminum, the modulus of elasticity of which is only about a third of that of steel.

BRIEF SUMMARY OF THE INVENTION

The object underlying the invention is, therefore, to propose a handlebar which obviates the disadvantages described hereinabove and, with use of the lowest possible amount of material, is adequately dimensioned with respect to both the bending stress and the clamping strain.

This object is accomplished in accordance with the invention in that the wall thicknesses of the center section and the two outer sections are identical.

The advantage of the inventive solution is to be seen in that, on the one hand, adequate stability is provided for the bending moments, and, on the other hand, the stability also withstands the required clamping strain, and, in addition, the inventive handlebar is of such design that there is as great a saving of material as possible.

In an embodiment which is particularly advantageous with respect to the saving of material, provision is made for the wall thicknesses of the bent, tapering sections to correspond at every point approximately to those of the center section and the outer sections. On the one hand, this solution takes into account the bending moments to be applied, and, on the other hand, it involves a great saving of material.

In an alternative solution, provision is made for the wall thickness of the bent, tapering sections to increase from the center section to the respective outer section.

This solution saves less material than the solution providing an approximately identical wall thickness, but has the advantage that it is particularly expedient to manufacture and that the slightly higher material consumption owing to the wall thickness increasing from the center section to the respective outer section is compensated by the simple manufacturability.

In order to obtain the inventive wall thickness corresponding to that of the center section in the region of the outer section, too, provision is preferably made for the wall thickness of the bent, tapering sections to pass in the region of a transition to the respective outer section from a maximum wall thickness to the wall thickness of the outer section, with the transition preferably not occurring abruptly but in the form of a phasing-out of the thicker wall thickness of the bent section in this region to the wall thickness of the outer section.

The invention further relates to a process for the manufacture of a handlebar for vehicles, in particular, motorcycles and bicycles, comprising a tubular center section, preferably of round cross section, two tubular, straight outer sections, preferably of round cross section, the center axes of the two outer sections not coinciding with the center axis of the center section and the outer diameter of the two outer sections being smaller than that of the center section, and two tubular, bent sections joining the center section and the two outer sections, the outer diameter of the two tubular, bent sections tapering from the center section to the outer sections, wherein, in accordance with the invention, a tube with a cross section corresponding to the cross section of the center section and with a wall thickness corresponding to the wall thickness of the center section is used for forming the center section, and the tube is subsequently reshaped by rotary kneading or swaging into continuously tapering sections, and the outer section having a constant cross section is formed on these.

Herein it is particularly advantageous for the wall thickness in the outer section to be defined by insertion of a mandrel during the rotary kneading or swaging.

The following description of features and advantages of preferred embodiments of the invention serves in conjunction with the drawings to explain the invention in greater detail.

BRIEF DESCRIPTION OF THE DRAWINGS

The drawings show:

FIG. 1 a view of an inventive handlebar in the direction of travel;

FIG. 2 a plan view of the handlebar in the direction of arrow II in FIG. 1;

FIG. 3 a cross section along line III—III in FIG. 1;

FIG. 4 a cross section along line IV—IV in FIG. 1;

FIG. 5 a half-side, enlarged longitudinal section through a first embodiment of the inventive handlebar according to FIGS. 1 to 4;

FIG. 6 a half-side, enlarged longitudinal section through a second embodiment of the inventive handlebar according to FIGS. 1 to 4; and FIG. 7 a schematic representation of a process for the manufacture of the second embodiment.

DETAILED DESCRIPTION OF THE INVENTION

An inventive handlebar generally denoted by 10 comprises a straight center section 12 and two straight outer sections 13 and 13'. The center axis 12M of the center section 12 and the center axes 13M, 13M' of the outer sections 13 and 13' are not identical, i.e., they preferably extend askew in relation to each other.

The center section 12 and the two outer sections 13 and 13' are connected to each other by bent sections 14 and 14', respectively, of the handlebar.

The center section 12 and the bent sections 14 and 14' of the handlebar 10 preferably lie in a plane 12E, while the straight outer section 13 lies in a plane 13E and the straight outer section 13' likewise in a plane 13E', which both do not coincide with the plane 12E, but each intersect the plane 12E, and, in particular, the center axes 13M and 13M' penetrate the plane 12E.

The planes 13E and 13E' preferably include the same angle with the plane 12E, but are inclined in opposite directions relative thereto.

The handlebar 10 is preferably symmetrical with a center plane 15 which intersects the center section 12 at the center thereof, and, in particular, extends perpendicularly to the center axis 12M of the center section 12.

As illustrated in FIG. 3, the straight center section 12 comprises a tube of round cross section with a wall thickness S, and an outer diameter DA of the tube and an inner diameter DI of the tube correspond to the diameters of concentric circles. For example, the outer diameter DA is 28 to 30 mm.

The two straight outer sections 13 and 13' are likewise formed by a tube whose outer diameter Da is smaller than the outer diameter DA of the center section 12, for example, 22 mm.

The wall thickness of the tube forming the outer sections 13, 13' is, however, equal to the wall thickness of the tube forming the center section 12 and is likewise S, with S being=Da/2–Di/2.

In a first embodiment of the handlebar according to FIGS. 1 to 4, illustrated in FIG. 5, the cross section of the bent tubular section 14 joining the center section 12 to the outer section 13 tapers continuously and, therefore, at every point along the bent section 14, the cross section is formed by two concentric circles and the wall thickness is approximate to S. Slight deviations due to the manufacturing process are, however, possible. The same applies to the bent section 14' which extends between the center section and the outer section 13'.

In a second embodiment of the handlebar according to FIGS. 1 to 4, illustrated in FIG. 6, the outer diameter of the bent sections 24, extending between the center section 12 and the outer section 13 likewise tapers continuously as in the first embodiment, and the outer diameter decreases from an outer diameter DA, with which the bent section 24 adjoins the center section 12, to the smaller outer diameter Da, with which the bent section 24 adjoins the outer section 13.

In contrast to the first embodiment, however, the wall thickness in the bent section 24 changes from a wall thickness W1, which approximately corresponds to the wall thickness S and exists immediately adjacent to the center section 12, to a wall thickness W2, which clearly exceeds the wall thickness W1 and decreases immediately before a transition to the outer section 13 to a wall thickness W3, which approximately corresponds to the wall thickness S in the outer section 13.

This increase in the wall thickness, illustrated in FIG. 6, from the value W1 to W2 and the decrease thereof to the value W3 are related to the special manufacturing process of the handlebar according to the second embodiment.

Such a handlebar is preferably manufactured by a so-called rotary kneading or swaging, wherein, as illustrated in FIG. 7, one starts with a tube whose cross section and diameter correspond to those of the center section 12. This tube is acted upon with a tool 26 in the region of the later bent section 24 and the respective later outer section 13 in the radial direction R and thereby deformed such that its outer diameter is reduced from diameter DA to diameter Da.

In order to set the wall thickness at wall thickness S, there is introduced in the region of the outer sections 13 a mandrel 28 with which an inner diameter Di is definable in the region of the respective outer section 13, while the conically tapering section 24 remains hollow during this rotary kneading or swaging. As the tapering of the outer diameter of the section 24 increases due to the rotary kneading or swaging, an accumulation of material occurs due to the reduction in the outer diameter and results in a wall thickness successively increasing from wall thickness W1 to wall thickness W2, while wall thickness W3 again corresponds to wall thickness S in section 24 because the mandrel 28 was introduced to set the wall thickness in the outer section 13 and also projects with a preferably conically tapering front region 30 into a region 32 of the section 24 adjoining the outer section 13 so that the mandrel 28 defines the inner diameter Di in the outer section 13 and in the region 32. In these regions of the tube reached by the mandrel 28, a flow of material then occurs in the axial direction away from the center section 12.

During the rotary kneading or swaging by means of the tool 26, for example, a roller, a relative movement between the tube to be worked and the tool 26 is preferably generated, for example, such that the roller 26 acting with a force in the radial direction on the tube rolls helically on an outer circumference of the tube and thus brings about a decrease in the outer diameter in the radial direction R.

I claim:

1. Handlebar for vehicles comprising a tubular, straight center section extending along a center axis and having an outer diameter and a wall thickness, two tubular, straight outer sections each extending, along a center axis, the center axes of each outer section not coinciding with said center axis of said center section, said outer sections having an outer diameter being smaller than said outer diameter of said center section and a wall thickness corresponding to the wall thickness of said center section, and two hollow, bent sections, said bent sections joining said center section and extending to said outer sections, said bent sections having an outer diameter tapering from said outer diameter of said center section to said outer diameter of said outer sections.

2. Handlebar as defined in claim 1, wherein the wall thickness of said bent, tapering sections corresponds at every point approximately to the wall thickness of said center section and said outer sections.

3. Handlebar as defined in claim 1, wherein said bent, tapering sections have a wall thickness increasing from said center section to said respective outer section and starting at said center section with the wall thickness of said center section.

4. Handlebar as defined in claim 3, wherein said bent, tapering sections have a transition region extending from said respective bent section to said respective outer section and wherein the wall thickness of said transition region changes from a maximum wall thickness to the wall thickness of said outer section.

5. Handlebar as defined in one of the preceding claims, wherein the handlebar is of symmetrical design in relation to a center plane extending perpendicularly to the center axis of said center section.

6. The handlebar according to claim 1, wherein said center section and said outer sections have round cross sections.

7. The handlebar according to claim 1, wherein said handlebar is a motorcycle handlebar.

8. The handlebar according to claim 1, wherein said handlebar is a bicycle handlebar.

* * * * *